United States Patent
Zaharia et al.

(10) Patent No.: US 6,483,047 B1
(45) Date of Patent: Nov. 19, 2002

(54) ELEVATOR BRAKE LOAD WEIGHING SYSTEM

(75) Inventors: Vlad Zaharia, Rocky Hill; Nigel B. Morris, Cromwell, both of CT (US)

(73) Assignee: Otis Elevator Company, Farmington, CT (US)

( * ) Notice: Subject to any disclaimer, the term of this patent is extended or adjusted under 35 U.S.C. 154(b) by 62 days.

(21) Appl. No.: 09/660,779

(22) Filed: Sep. 13, 2000

(51) Int. Cl.[7] .................. G01G 19/14; B66B 1/44
(52) U.S. Cl. ............. 177/142; 177/147; 177/245; 177/210 R; 187/276; 187/393
(58) Field of Search ............. 177/147, 210 R, 177/245, 132, 142; 187/276, 393

(56) References Cited

U.S. PATENT DOCUMENTS

| | | | |
|---|---|---|---|
| 3,610,342 A | 10/1971 | Stainken | 177/147 |
| 4,754,850 A | 7/1988 | Caputo | 187/115 |
| 4,766,977 A | 8/1988 | Yamasaki | 187/20 |
| 5,156,239 A | * 10/1992 | Ericson et al. | 177/132 |
| 5,343,003 A | * 8/1994 | Jamieson et al. | 177/132 |
| 5,345,042 A | * 9/1994 | Jamieson | 177/132 |
| 5,456,119 A | * 10/1995 | Nakazaki et al. | 73/841 |
| 5,837,946 A | * 11/1998 | Johnson et al. | 177/210 R |
| 6,305,503 B1 | * 10/2001 | Suzuki et al. | 187/393 |

* cited by examiner

Primary Examiner—Randy W. Gibson

(57) ABSTRACT

Load cells 35, 56 on antirotation dowel pins 28a or load mounts 49 indicate brake reaction forces in the disk brake 8, 8a of an elevator. Vertical load cells 72, 73 on bending load cell 80 indicate vertical brake reaction loads on a rail 60. A table indicating the load of an empty car at each of the landings served by the car permits subtracting load components relating to ropes, chains and cables to provide a live load indication prior to brake release; this may be used to determine if the load exceeds the maximum permissible load for the car.

12 Claims, 3 Drawing Sheets

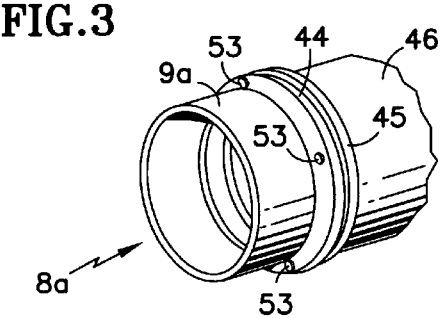
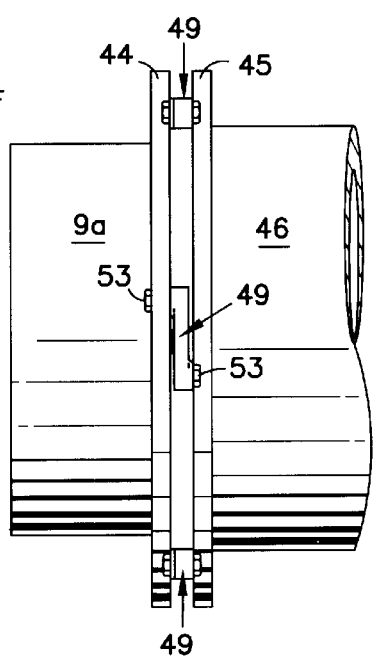
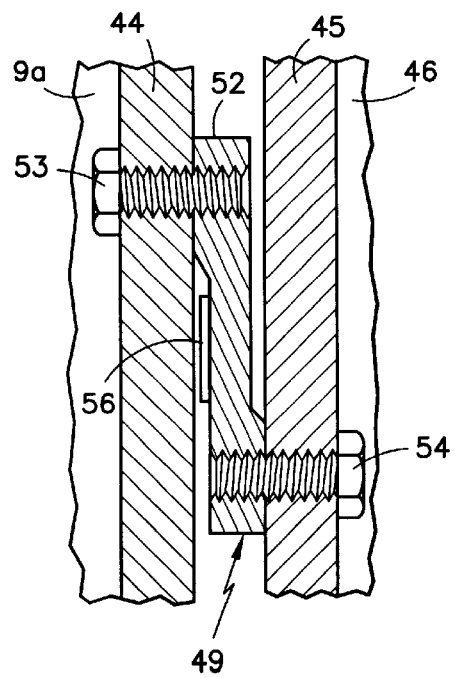

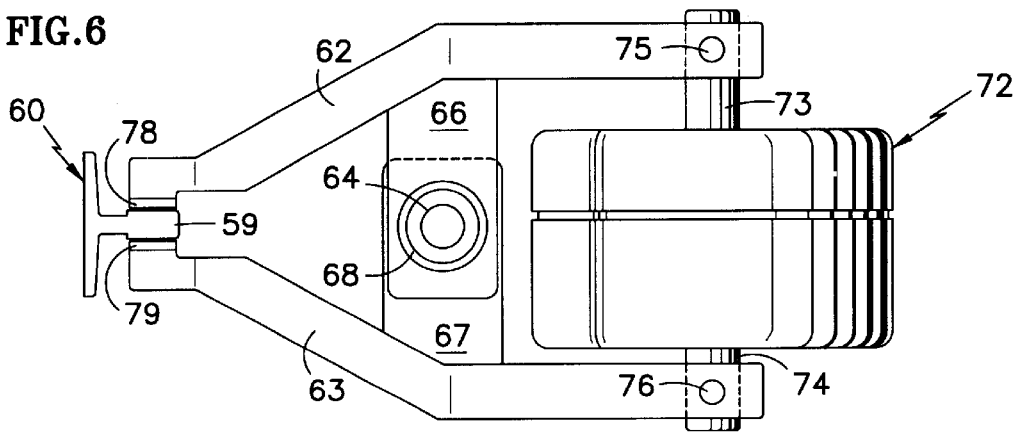
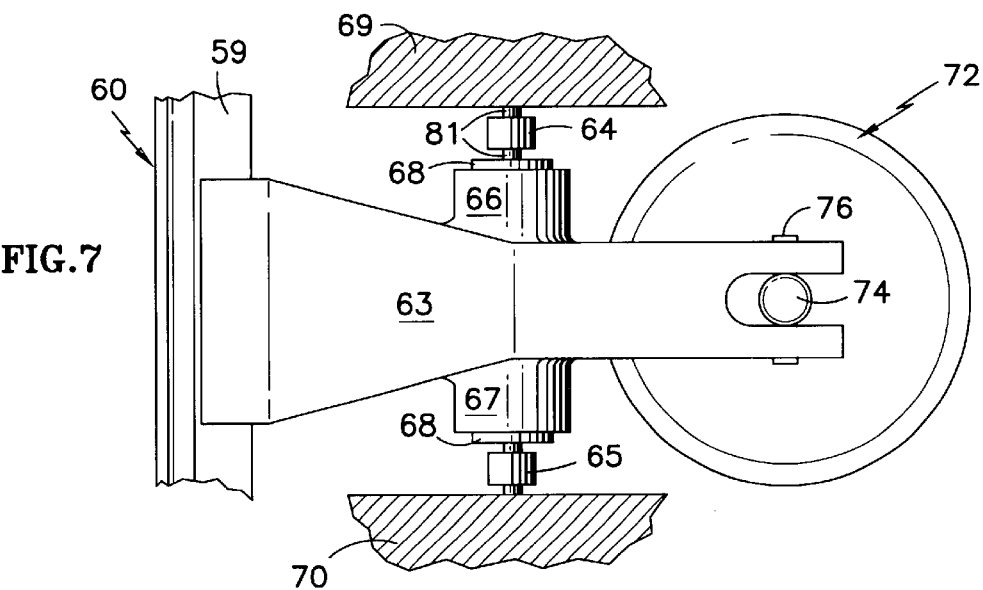
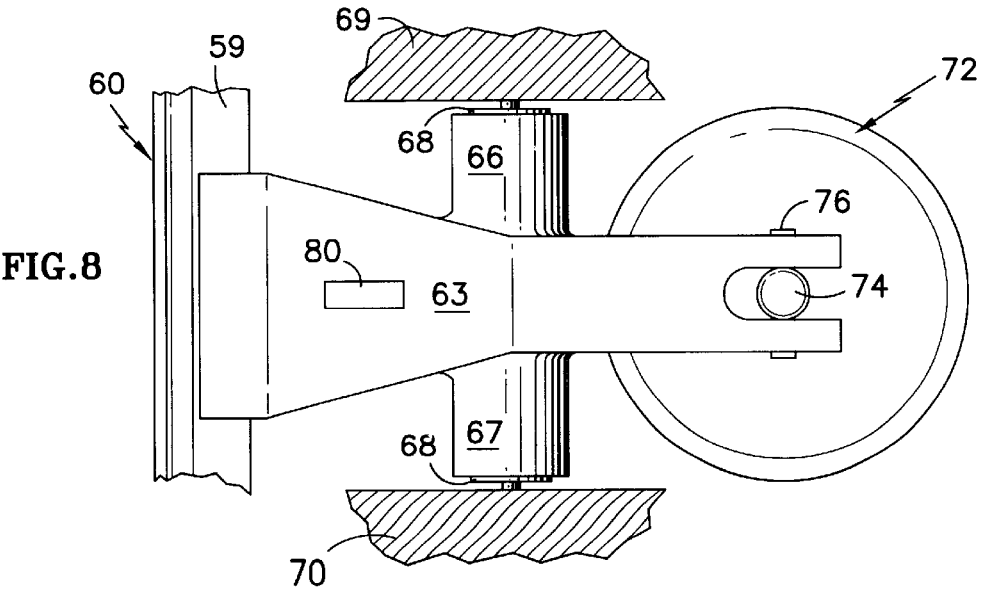

ELEVATOR BRAKE LOAD WEIGHING SYSTEM

TECHNICAL FIELD

This invention relates to measuring elevator load by load cells integrated with elevator brake anti-rotation pins, brake mountings, and calipers, and measuring elevator car line load therewith.

BACKGROUND ART

It has been shown in U.S. Pat. No. 3,610,342 and 4,754,850 that elevator brake reaction force can be measured so as to pretorque the motor drive in a closed loop fashion so that the motor torque exactly balances the car load, and the magnitude of current that produces the balancing torque is indicative of the live load in the car (passengers), by taking out the contribution of hoist ropes, compensation ropes and chains, and traveling cable. This can then be used to govern the generation of motor commands by the motion controller, and may be used as well for an indication of numbers of passengers in a car which is useful in dispatching algorithms. However, the methods used heretofore to eliminate contributions of ropes, chains and cables are very complex, cumbersome and time consuming. It is necessary that the apparatus which measures the brake reaction torque be of sound design, of low cost, reliable, and requiring little or no maintenance. Use of the current that balances torque to determine whether or not a live load exceeds the maximum permitted load for the car, since it can be measured only with brake off, can be dangerous, and may violate some regulatory codes.

DISCLOSURE OF INVENTION

Objects of the invention include provision of improved measurement of elevator brake reaction torque, with apparatus which is reliable, inexpensive, and requiring little maintenance; determining whether the live load in the car exceeds maximum permissible load while the brake is still engaged; and providing a simple method for extracting the live load of an elevator from elevator motor shaft load measurements, for use in motion control and dispatching algorithms.

According to the present invention, elevator brake reaction torque is measured by load cells (which may be strain gauges or the like) either on antirotation pins between the brake casing and a set of brake pads, or on load mounts between the brake casing and stationary structure, such as the motor mounting structure, including the motor casing. The load cells may measure flexure or may measure tension and compression.

In one disclosed embodiment, antirotation pins are mounted within the electromagnetic brake release coil in a manner to allow minimal flexure as the pins are distorted by brake reaction force imposed on disk brake pads tangentially to motor rotation. In another disclosed embodiment, the brake housing is mounted to a motor housing by means of load mounts containing load cells that are disposed tangentially of the rotation and measure brake reaction forces in either direction of rotation in response to both tension and compression. One guide rail brake embodiment mounts the brake with vertical load cells; another senses bending of the brake caliper jaw pieces.

In further accord with the present invention, in a preliminary process, the load in the elevator car when empty is determined, such as by brake reaction force, at each landing that the elevator serves, just prior to releasing the brake at a start of a run, and a corresponding empty car load signal is recorded for each of said landings. Thereafter, in normal operation, the empty car load value for the current landing is subtracted from a current load signal measured for the car just prior to releasing the brake for a run at any given landing, and the resulting difference signal may be utilized for motion control and dispatching algorithms, including determining whether the load in the car exceeds the maximum permissible load prior to brake release.

The invention may be used with disk brakes, caliper brakes, drum brakes, rail brakes, in roped systems, with motors in machine rooms, in elevator shafts, on cars or on counterweights, and in other systems using a brake to hold the car in a non-running position.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 3 is a partial perspective view of an elevator disk brake housing mounted to an elevator motor housing with load cells of the invention.

FIG. 4 is a side elevation view of the apparatus of FIG. 3.

FIG. 5 is an expanded, sectional view of the load mount illustrated in FIGS. 3 and 4.

FIG. 6 is a top plan view of a caliper brake according to the invention.

FIG. 7 is a partially sectioned and broken away side elevation view of the caliper brake of FIG. 6.

FIG. 8 is a partially sectioned broken away side elevation view of an alternative embodiment.

MODE(S) FOR CARRYING OUT THE INVENTION

Figure 1:
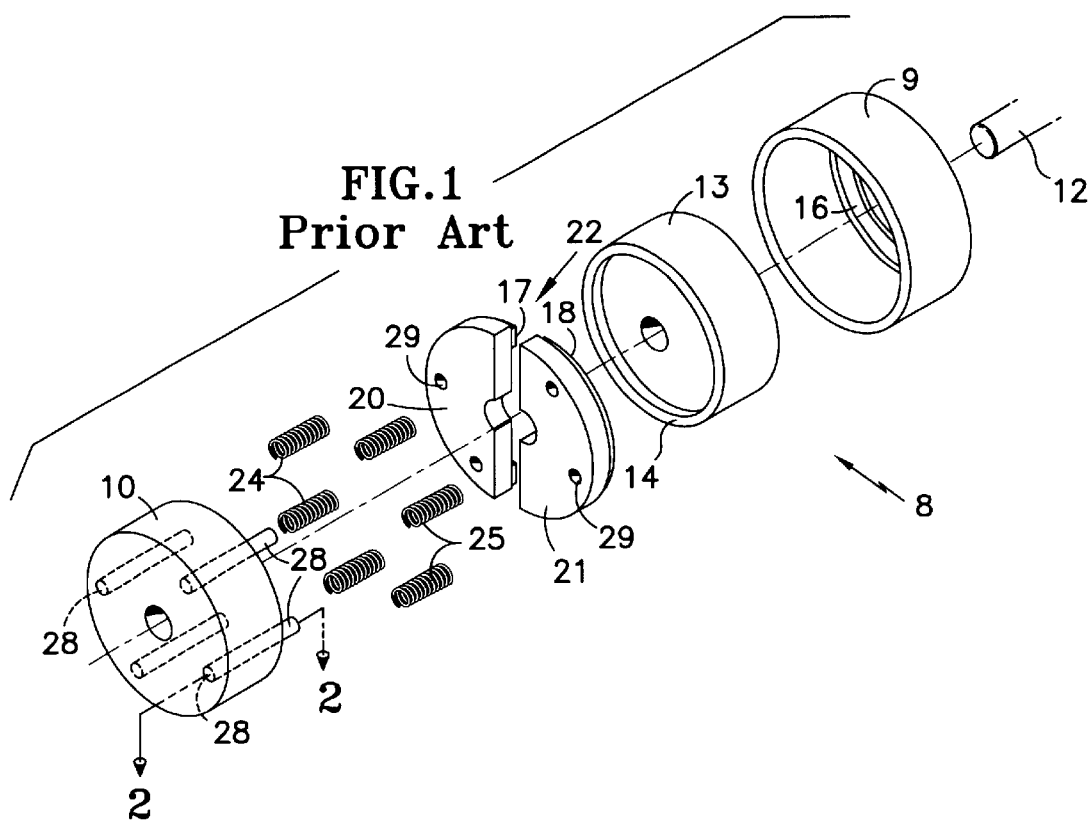
FIG. 1 is a simplified exploded view of a portion of a conventional elevator disk brake which is commercially available, and which may be modified to employ the present invention.

Referring to FIG. 1, an elevator disk brake assembly, shown in FIG. 1 in a stylistic manner for clarity, includes a housing 9 and a cap 10 for the housing: the cap 10 comprising an electromagnetic coil which, when energized, will release the disk brake so the elevator can move; the cap 10 is bolted or otherwise firmly secured to the housing 9 by bolts or other means not shown. The housing 9, with the cap 10, is generally fixed to the structure of the elevator drive system, such as directly attached to the elevator motor housing or otherwise. The elevator motor shaft 12 is splined or otherwise connected with a bifacial brake disk 13 so that the disk 13 always rotates with the shaft 12 and thereby can arrest the motion of the shaft 12. Disk 13 must be able to slide along the shaft 12 sufficiently so as to engage and release the brake, as is described more fully hereinafter. The bifacial brake disk 13 has two disk surfaces, one of which 14 is visible in FIG. 1, and the other being on the opposite side of the bifacial disk 13. The casing 9 has brake pads 16, and additional brake pads 17 and 18 are disposed on respective halves 20 and 21 that comprise a moveable brake pad member 22. The brake pads 17, 18 interact with the disk face 14 while the brake pads 16 interact with the opposite disk brake surface in an obvious manner. A plurality of springs 24, 25 normally urge the halves 20 and 21 into engagement with the bifacial disk 13 sufficiently so that it will move to the right as seen in FIG. 1 and engage the pads 16 in response to the pads 17, 18 engaging the disk surface 14. Thus, the brake normally is forced into the engaged position by the springs 24, 25. However, to release the brake, a conventional brake release magnetic coil within the cap 10 is energized, thereby attracting the halves 20 and 21 with a force which is sufficient to overcome the compressive force of the springs 24, 25 and thus release the brake. In this process, the bifacial disk 13 will move slightly to the left so as to be released from the brake pads 16 within the housing 9. In a preferred disk brake, there may be another set of springs within the ring of springs 24, 25 shown in FIG. 1 and there may be spring adjustment mechanisms associated with the cap 10 to adjust the pressure applied to the halves 20, 21 by the springs. In order to restrain the halves 20, 21 from rotating when the pads 17, 18 engage the disk surface 14, a plurality of antirotation dowel pins 28 are disposed in the cap 10 and engage corresponding holes 29 in the halves 20, 21. The description thus far is of a simplified version of a conventional elevator disk brake which is currently available.

Figure 2:
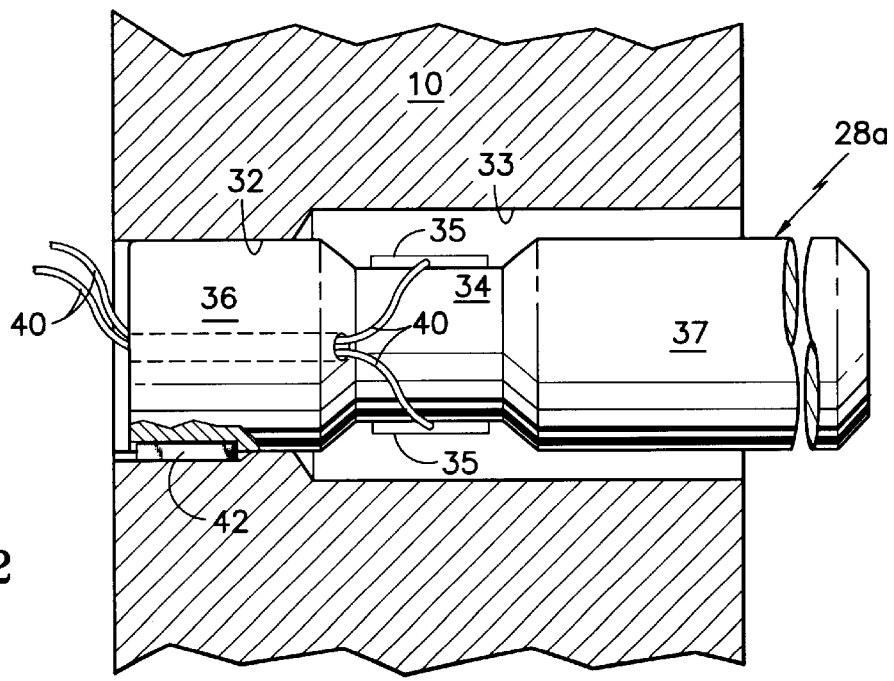
FIG. 2 is a partial sectional view taken on the line 2—2 in FIG. 1, illustrating an antirotation pin according to the invention with load cells disposed thereon.

Referring to FIG. 2, the cap 10 has pin-accommodating holes, each with a reduced portion 32 that tightly grip the pin 28a and an enlarged portion 33 that allows the pin 28a to move, tangentially with the rotation of the disk 13, in response to brake reaction force on the pads 17, 18. The pin 28a has a reduced portion 34 upon which one or more load cells 35 may be mounted to measure the bending of the pin 28a in response to brake reaction force. The brake reaction force on the pin 28a is vertical as viewed in FIG. 2. An enlarged portion 36 of the pin 28a is within the reduced portion 32 of the hole in the cap 10; an enlarged portion 37 of the pin 28a slidably engages the holes 29 within the halves 20, 21.

The pin 28a must be maintained with the orientation shown so that the load cells 35 will measure bending as a result of forces tangential to rotation of the disk 13, by suitable means, such as a key 42.

An embodiment with a single set of brake pads 17, 18 (without brake pads 16) may be effected by affixing the disk 13 rigidly to the shaft 12, so the disk cannot slide along the shaft.

In operation, the amount of bending of the pin 28a results in a corresponding signal from the one or more load cells 35 which is provided over signal lines 40 to a controller. When the signal on the lines 40 indicates that there is no load on the pins 28a, the current in the motor is just sufficient to carry the entire unbalanced weight of the elevator system, including the excess of the counterweight over that of the car, or the excess weight of the car plus passengers over the counterweight, along with the weight of hoist ropes, compensation ropes or chains, and traveling cable. When this occurs, the brake can be released without the car moving upwardly or downwardly when beginning a run. In addition, the amount of current being supplied to the motor at that time, being indicative of the total weight supported by the motor, may be utilized in motion control and dispatching algorithms.

FIGS. 3–5 illustrate a second embodiment of the invention in which a casing 9a has a flange 44 that is mounted to a flange 45 of a motor casing 46 (or other stationary structure) by means of load mounts 49. In FIG. 5, the load mount comprises a structural member which is securely fashioned to the flange 44 by a bolt 53 at one end and is securely fashioned to the flange 45 by a bolt 54 at its other end. Midway of the fastenings there is disposed a strain gauge 56 which will measure either the tension or compression of the structural member 52 as a consequence of brake reaction forces being transmitted to the casing 9a by the brake pad 16 and through the cap 10 and the halves 20, 21 from the brake pads 17, 18. An indication of tension from the load cell 56 will indicate an overbalance on one side of the system (such as the car side of the system), whereas an indication of compression from the load cell 56 will indicate an overbalance on the other side of the system (such as the counterweight side). The amount of tension or compression indicated by signals from the load cell 56 is indicative of the amount of brake reaction force, and when it is zero, indicates that the elevator motor is totally supporting the system imbalance, and the current thereof is indicative of the load in the system. This indicates when the brake may be released without the car moving upwardly or downwardly, and the magnitude of current in the motor is indicative of the load, which as described hereinbefore, may be utilized in motion control and dispatching algorithms.

Referring to FIG. 6, another embodiment of the invention comprises a brake that operates against the two faces of the stem 59 of a guiderail 60. A pair of jaw pieces 62, 63 are pivotably supported by cross members 66, 67 on a pivotal support 68, the pivotal support 68 is suspended between surrounding structure 69, 70 by means of load cells 64, 65.

A spring and electromagnet assembly 72 includes one or more heavy compression springs that, through members 73, 74 and pins 75, 76, normally spread the rightward ends (as seen in the figures) of the jaw pieces 62, 63 apart, which, through the action of the pivotal support 66, causes the left ends of the jaw pieces 62, 63 to come together, thereby causing friction brake pads 78, 79 to firmly grip the faces of the stem 59. When the brake is to be released, the electromagnet within the assembly 72 is operated, drawing the pins 75, 76 together thereby to cause the brake pads 78, 79 to separate from the stem of the rail. Except for the load cells 64, 65, the description thus far is of a conventional caliper-type elevator brake. The load cells 64, 65 may be of the type having threaded rods 81 extending outwardly therefrom, which are threaded into or secured with nuts to adjacent pieces 68, 69. In operation, when the brake is engaged, the upward or downward force representing the total load of the car on the structures 69, 70 will be imparted through the load cells to the jaw pieces 62, 63. Therefore, the load cells 64, 65 will provide signals indicative of the total weight in the car.

Another embodiment of the invention is shown in FIG. 8. This embodiment is similar to that of FIGS. 6 and 7, but instead of having vertical load cells 64, 65, the embodiment of FIG. 8 has one or more load cells 80 to secure bending in the jaw pieces 62, 63 which results from brake reaction force.

Another aspect of the present invention includes provision of live load signals utilizing a simplified method, which has the additional advantage of being able to indicate whether or not the load in the car exceeds the maximum permissible load prior to releasing the brake. During preliminary data gathering, the car is moved to each of the floors which it serves, while empty, and a measure of car load, such as may be obtained by the foregoing embodiments or by other measurement of brake reaction torque, is recorded for that landing. Thereafter, in normal use of the elevator, each time that a car is preparing to start a run, before releasing the brake, the load is again measured in the same way. The difference between the empty car load recorded for that particular landing and the current car load is utilized as an indication of the live load in the car. Since this is obtained prior to release of the brake, in contrast with use of balancing torque current, the load indication can be utilized prior to brake release to determine if there is an excessive load in the car.

The aforementioned patents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. Load measuring apparatus for an elevator having a motor disposed on a structure, comprising:

a brake casing including a cap connected to said structure;

a shaft for rotation by said motor, said shaft extending into said casing;

an electromagnetic brake release coil disposed within said casing;

a brake surface disposed within said casing and engaging said shaft for rotation with said shaft;

a brake pad member disposed within said casing adjacent said brake surface;

a plurality of brake engaging springs for urging said brake pad member into contact with said brake surface so as to arrest motion of said shaft;

a plurality of antirotation dowel pins affixed to said casing and slidably engaging said brake pad member to prevent movement of said brake pad member while allowing said brake pad member to move from a brake engaged position in contact with said brake pad member to a brake released position remote from said brake pad member;

characterized by the improvement comprising:

at least one load cell disposed on one or more of said pins to measure bending of said one or more pins as a function of brake reaction force to provide a load signal indicative of the load on said shaft.

2. Apparatus according to claim 1 wherein:

there is at least one load cell disposed on each of said pins.

3. Apparatus according to claim 2 wherein there are two of said load cell on each of said pins.

4. Load measuring apparatus for an elevator having a motor disposed on a structure, comprising:

a brake casing including a cap connected to said structure;

a shaft for rotation by said motor, said shaft extending into said casing;

an electromagnetic brake release coil disposed within said casing;

a brake surface disposed within said casing and engaging said shaft for rotation with said shaft;

a brake pad member disposed within said casing adjacent said brake surface;

a plurality of brake engaging springs for urging said brake pad member into contact with said brake surface so as to arrest motion of said shaft;

a plurality of antirotation dowel pins affixed to said casing and slidably engaging said brake pad member to prevent movement of said brake pad member while allowing said brake pad member to move from a brake engaged position in contact with said brake pad member to a brake released position remote from said brake pad member;

characterized by the improvement comprising:

at least four elements, each having at least one load cell, for connecting said casing with said structure to measure force between said casing and said structure as a function of brake reaction force to provide a load signal indicative of the load on said shaft.

5. Apparatus according to claim 1 wherein:

said brake surface is a disk; and said brake pad member has a flat brake pad disposed thereon.

6. Apparatus according to claim 5 further comprising:

a second brake pad disposed inside said casing; and wherein:

said disk is bifacial and is slidably disposed on said shaft so that pressure applied by said springs to said brake pad member forces said brake pad member to move said disk into engagement with said second brake pad.

7. Load measuring apparatus for an elevator having a guide rail brake disposed on a structure, comprising:

a vertical pivotal support;

a pair of jaw pieces rotatable on said pivotal support and having arms disposed on opposite sides of said pivotal support and extending to said guide rail to form a caliper, each jaw piece having a face disposed in proximity with a corresponding opposite side of said guide rail;

a pair of friction brake pads, one mounted on each of said faces;

a spring and electromagnet assembly disposed on a side of said pivotal support which is opposite from said guide rail, said spring normally forcing said brake pads into a brake engaged position in contact with said rail, operation of said electromagnet moving said brake pads into a brake released position out of contact with said rail;

characterized by the improvement comprising:

at least one load cell for providing a car load signal indicative of the total car load in response to brake reaction force, said load cell being disposed on a side of one of said jaw pieces to measure bending of said jaw piece in response to brake reaction force.

8. Load measuring apparatus for an elevator having a guide rail brake disposed on a structure, comprising:

a vertical pivotal support;

a pair of jaw pieces rotatable on said pivotal support and having arms disposed on opposite sides of said pivotal support and extending to said guide rail to form a caliper, each jaw piece having a face disposed in proximity with a corresponding opposite side of said guide rail;

a pair of friction brake pads, one mounted on each of said faces;

a spring and electromagnet assembly disposed on a side of said pivotal support which is opposite from said guide rail, said spring normally forcing said brake pads into a brake engaged position in contact with said rail, operation of said electromagnet moving said brake pads into a brake released position out of contact with said rail;

characterized by the improvement comprising:

two load cells, one at each end of said pivotal support disposed vertically between said pivotal support and said structure for providing a car load signal indicative of the total car load in response to brake reaction force.

9. Apparatus according to claim 7 wherein there are two load cells, one on a side of each of said jaw pieces.

10. A method for determining live load of an elevator car, comprising:

first, as preliminary data gathering
  (a) with said car empty, moving said car to each landing which the car serves; characterized by:
  (b) engaging the brake at each landing to stop the elevator car;
  (c) at each landing, immediately before releasing the brake of the car at the start of each run, providing an empty car load signal from a load cell responsive to brake reaction force indicative of the total car load using a load measuring apparatus according to either claim 1 or claim 8, and recording the empty car load signal corresponding to each said landing;

thereafter, during normal elevator operation
  (d) engaging the brake to stop the elevator car at each landing
  (e) at each landing immediately before releasing the brake of the car at the start of each run, providing a current car load signal from a load cell responsive to brake reaction force indicative of the load on said shaft using said load measuring apparatus;
  (f) providing a difference signal as a function of the difference between said empty car load signal recorded for the corresponding landing and said current car load signal; and
  (g) controlling the operation of said elevator car depending in part on said difference signal.

11. A method for determining live load of an elevator car having a drive shaft, comprising:

first, as preliminary data gathering
  (a) with said car empty, moving said car to each landing which the car serves; characterized by:
  (b) engaging the brake at each landing to stop the elevator car;
  (c) at each landing, immediately before releasing the brake of the car at the start of each run, providing an empty car load signal from a load cell responsive to brake reaction force indicative of the total car load, and recording the empty car load signal corresponding to each said landing;

there after during normal elevator operation
  (d) engaging the brake to stop the elevator car at each landing
  (e) at each landing immediately before releasing the brake of the car at the start of each run, providing a current car load signal from a load cell responsive to brake reaction force indicative of the load on said shaft;
  (f) providing a difference signal as a function of the difference between said empty car load signal recorded for the corresponding landing and said current car load signal; and
  (g) controlling the operation of said elevator car depending in part on said difference signal.

12. A method according to claim 11 wherein said step (g) comprises:
  comparing the load indicated by said difference signal to a maximum load limitation for said car and preventing the release of the brake of the car if said difference signal indicates a load in excess of said maximum load limitation for said car.

* * * * *